(12) United States Patent
Bondugula et al.

(10) Patent No.: US 12,341,784 B2
(45) Date of Patent: *Jun. 24, 2025

(54) CONTROLLING ACCESS TO SECURED DATA VIA TIMED FILTERING OF DATA

(71) Applicant: EQUIFAX INC., Atlanta, GA (US)

(72) Inventors: Rajkumar Bondugula, Irving, TX (US); Christopher Yasko, Milton, GA (US)

(73) Assignee: EQUIFAX INC., Atlanta, GA (US)

( * ) Notice: Subject to any disclaimer, the term of this patent is extended or adjusted under 35 U.S.C. 154(b) by 336 days.

This patent is subject to a terminal disclaimer.

(21) Appl. No.: 18/048,320

(22) Filed: Oct. 20, 2022

(65) Prior Publication Data

US 2023/0054085 A1  Feb. 23, 2023

Related U.S. Application Data

(63) Continuation of application No. 16/414,504, filed on May 16, 2019, now Pat. No. 11,489,843.

(60) Provisional application No. 62/672,189, filed on May 16, 2018, provisional application No. 62/740,650, filed on Oct. 3, 2018.

(51) Int. Cl.
*H04L 9/40* (2022.01)
*G06F 21/62* (2013.01)

(52) U.S. Cl.
CPC ........ *H04L 63/108* (2013.01); *G06F 21/6227* (2013.01); *H04L 63/205* (2013.01)

(58) Field of Classification Search
None
See application file for complete search history.

(56) References Cited

U.S. PATENT DOCUMENTS 5,724,556 A   3/1998  Souder et al.
9,781,743 B2 * 10/2017 van Loon ......... H04W 28/0247
(Continued)

FOREIGN PATENT DOCUMENTS

CN    103810441 A    5/2014
JP    2015125646 A   7/2015

OTHER PUBLICATIONS

US 11,374,940 B2, 06/2022, Bondugula et al. (withdrawn)
(Continued)

*Primary Examiner* — Kaveh Abrishamkar
(74) *Attorney, Agent, or Firm* — Kilpatrick Townsend & Stockton LLP

(57) ABSTRACT

According to certain implementations, an access control system controls access to secured data that is stored on a secured source. A requestor system may request information representing the secured data. The access control system receives the secured data from the secured source, and selects a portion of the secured data based on a lens including a filter criteria or a modification instruction. Adjusted data may be generated based on a modification of the selected portion of data, where the modification is based on the lens. The access control system provides the adjusted data to the requestor system via an access interface. In some cases, upon completion of a time period, the access control system prevents the requestor system from accessing the adjusted data, by disabling the access interface used to access the adjusted data. The adjusted data may be deleted from the access control system.

20 Claims, 5 Drawing Sheets

(56) References Cited

U.S. PATENT DOCUMENTS

| | | | |
|---|---|---|---|
| 9,785,786 | B2 | 10/2017 | Mattsson et al. |
| 10,311,522 | B1 | 6/2019 | Jin et al. |
| 10,990,689 | B1* | 4/2021 | Reiner .................. G06F 21/604 |
| 11,425,144 | B2 | 8/2022 | Bondugula et al. |
| 11,489,843 | B2* | 11/2022 | Bondugula ............ H04L 63/108 |
| 2003/0167401 | A1 | 9/2003 | Murren et al. |
| 2005/0246292 | A1* | 11/2005 | Sarcanin ............. G06Q 20/3674 |
| | | | 705/67 |
| 2007/0027810 | A1 | 2/2007 | Longnecker et al. |
| 2007/0244987 | A1 | 10/2007 | Pedersen et al. |
| 2008/0168135 | A1 | 7/2008 | Redlich et al. |
| 2011/0231443 | A1 | 9/2011 | Hannel et al. |
| 2011/0265162 | A1 | 10/2011 | Alavandar et al. |
| 2012/0192247 | A1 | 7/2012 | Oliver et al. |
| 2013/0031364 | A1 | 1/2013 | Glew et al. |
| 2013/0054363 | A1 | 2/2013 | Sasankan et al. |
| 2014/0090081 | A1 | 3/2014 | Mattsson et al. |
| 2014/0201126 | A1 | 7/2014 | Zadeh et al. |
| 2015/0163206 | A1 | 6/2015 | McCarthy et al. |
| 2017/0187730 | A1 | 6/2017 | Singla et al. |
| 2019/0166115 | A1 | 5/2019 | Manza et al. |
| 2019/0172564 | A1 | 6/2019 | Chandra et al. |
| 2019/0356672 | A1* | 11/2019 | Bondugula ............ H04L 63/205 |

OTHER PUBLICATIONS

Indian Patent Application No. 202117018662, "First Examination Report", Jan. 19, 2023, 6 pages.
Australian AU2019355802, "Notice of Acceptance", dated Jun. 27, 2024, 3 pages.
Canadian Application No. CA3,114,361, Office Action, Mailed On Aug. 12, 2024, 5 pages.
Singapore Application No. SG11202102794U, Notice of Decision to Grant, Mailed On Jun. 28, 2024, 3 pages.
Canadian Application No. CA3,114,361, Office Action, Mailed On Jan. 3, 2024, 7 pages.
European Application No. EP19869336.8 , "Intention to Grant", Nov. 23, 2023, 8 pages.
U.S. Appl. No. 16/414,504, "Non-Final Office Action", Oct. 22, 2021, 26 pages.
U.S. Appl. No. 16/414,504, "Notice of Allowance", Apr. 8, 2022, 9 pages.
U.S. Appl. No. 16/414,504, "Notice of Allowance", Jun. 29, 2022, 10 pages.
U.S. Appl. No. 16/652,309, "Corrected Notice of Allowability", Jul. 15, 2022, 2 pages.
U.S. Appl. No. 16/652,309, "Corrected Notice of Allowability", Mar. 16, 2022, 4 pages.
U.S. Appl. No. 16/652,309, "Non-Final Office Action", Sep. 14, 2021, 24 pages.
U.S. Appl. No. 16/652,309, "Notice of Allowance", Feb. 23, 2022, 20 pages.
European Patent Application No. EP19869336.8, "Extended European Search Report", May 30, 2022, 6 pages.
International Application No. PCT/US2019/052655, "International Preliminary Report on Patentability", Apr. 15, 2021, 6 pages.
International Application No. PCT/US2019/052655, "International Search Report and Written Opinion", Jan. 17, 2020, 9 pages.
Australian AU2019355802, "First Examination Report", mailed Jan. 18, 2024, 3 pages.

* cited by examiner

CONTROLLING ACCESS TO SECURED DATA VIA TIMED FILTERING OF DATA

CROSS-REFERENCES TO RELATED APPLICATIONS

This application is a continuation of and claims priority to and the benefit of U.S. patent application Ser. No. 16/414,504, filed on May 16, 2019, entitled "CONTROLLING ACCESS TO SECURED DATA VIA TIMED FILTERING OF DATA," which claims the benefit of priority of U.S. provisional application Ser. No. 62/672,189 for "CONTROLLING ACCESS TO SECURED DATA VIA TIMED FILTERING OF DATA," filed May 16, 2018, and to U.S. provisional application Ser. No. 62/740,650 for "CONTROLLING ACCESS TO MULTI-GRANULARITY DATA," filed Oct. 3, 2018, each of which is incorporated by reference herein in its entirety.

TECHNICAL FIELD

This disclosure relates generally to the field of data security, and more specifically relates to controlling access to secured data.

BACKGROUND

Information requestor systems may request data related to a user, and generate a classification recommendation of the user based on analysis of the requested information. The classification may indicate, for example, a recommendation in response to an expert query. The data that is requested may include secured data, including secured data that is available to the requestor system for a limited amount of time. In some cases, the requested data may include secured data from multiple source with different access policies or permissions. A conventional requestor system may retain data that is provided to it, creating a security vulnerability that could be attacked or exploited by malicious actors. Furthermore, retention of the data by the conventional requestor system could be inconsistent with the access policy of the source. If the conventional system accesses multiple sources of data with various access policies, some of the access policies may prevent the conventional system from using the data. To be compliant with the access policies of the multiple data sources, the conventional requestor system may generate a less accurate classification, based on only some of the requested data.

SUMMARY

According to certain implementations, an access control system receives, from a requestor system, a request for information. The request represents secured data that is stored by a secured source. The access control system provides the request to the secured source via a first access interface, and receives, from the secured source, the secured data and an identified time period. The access control system selects a portion of the secured data based on one or more lenses including a filter criteria or a modification instruction. In addition, the access control system generates adjusted data that comprises the requested information and a modification of the selected portion of data. The modification is based on the one or more lenses and the selected portion of data. The access control system provides the adjusted data via a second access interface, such as to the requestor system. In some cases, upon completion of the identified time period, the access control system prevents the requestor system from accessing the adjusted data, by disabling the second access interface. In addition, the access control system deletes the adjusted data from a local memory device, and disables the first access interface.

These illustrative aspects are mentioned not to limit or define the disclosure, but to provide examples to aid understanding thereof. Additional aspects are discussed in the Detailed Description, and further description is provided there.

BRIEF DESCRIPTION OF THE DRAWINGS

Features, implementations, and advantages of the present disclosure are better understood when the following Detailed Description is read with reference to the accompanying drawings, where.

DETAILED DESCRIPTION

Figure 1:
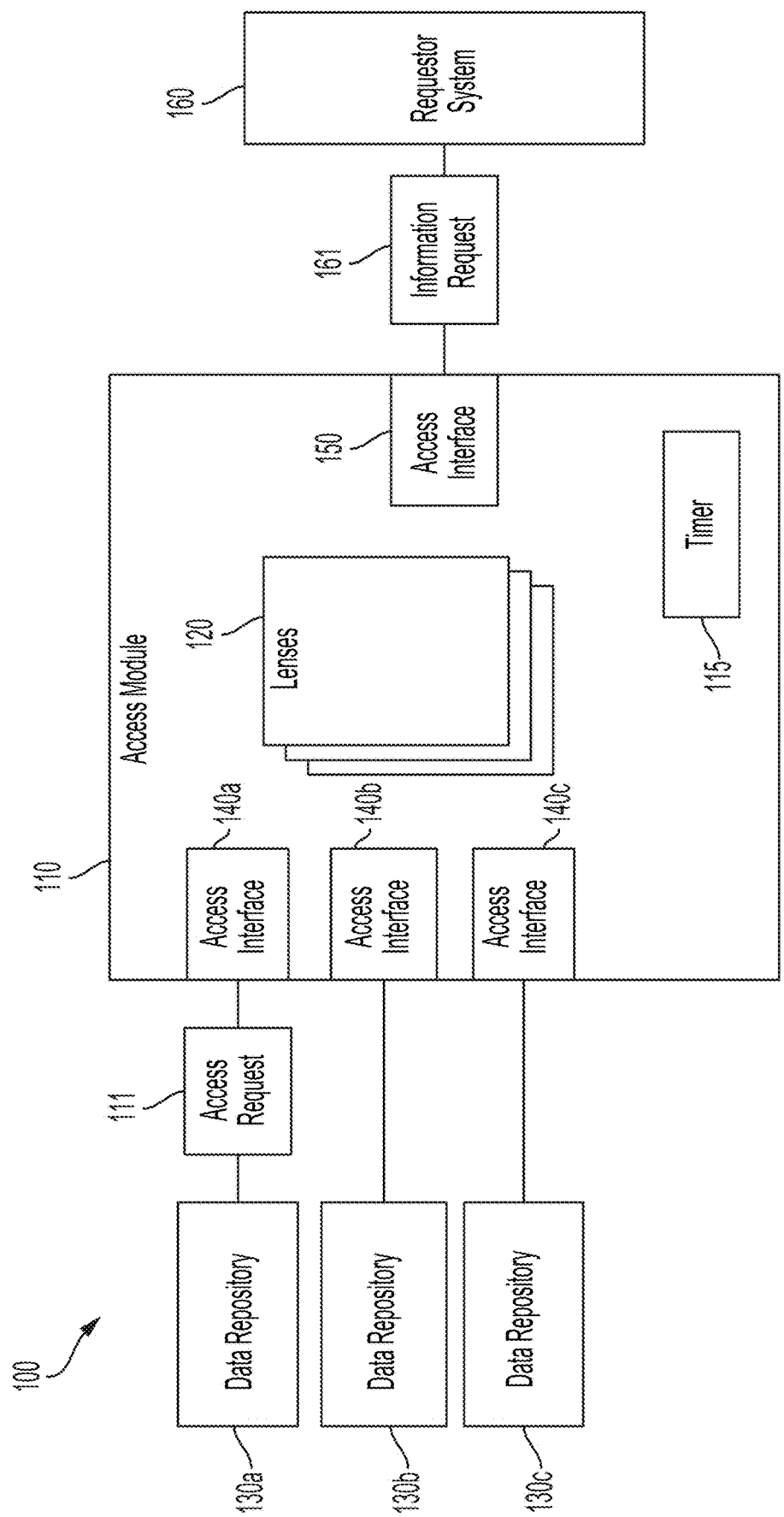
FIG. 1 is a block diagram depicting an example of a computer system for controlling access to secured data, according to certain implementations.

According to certain implementations, an access module may control access to secured data received from multiple sources. The access module may enable (or disable) access interfaces to additional computing systems, such as a data repository that stores secured data, or a requestor system that requests information from the secured data. The access module may also use lenses to modify the secured data. Modifications may be based on an access policy associated with the data repository. For example, the access module may generate adjusted data that includes the requested information, but modifies or omits other portions of the secured data, based on one or more of the lenses. The access module may allow the requestor system to access the adjusted data, but not the secured data. In some cases, the adjusted data may be available to a requestor system for a limited amount of time. In addition, the adjusted data may be deleted (or otherwise withheld) from the requestor system after the period of time is completed. An access module that is located remotely from a requestor system may improve security by reducing opportunities for inappropriate modification (e.g., hacking) by the requestor system. In addition, the remote location of the access module may improve security for the secured data, by leveraging the access module's ability to generate adjusted data without permitting the requestor system access to a source of secured data that is being adjusted.

As discussed above, prior techniques for providing data to a requestor system do not adequately protect sensitive information represented by secured data. In addition, the data that is analyzed may include large quantities of sensitive types of information, such as employment history, educational information, financial information, or medical history. Conventional requestor systems may request the sensitive information to generate an accurate classification. However, the classification recommendation may be considered inappropriate by a person associated with the sensitive information. If the requestor system has access to secured data representing all of the person's sensitive information, the person may consider the generated recommendation an invasion of privacy. As a result, secured data may not be used to its fullest extent in a conventional system.

By contrast, an access control computing system may mediate information requests and responses between additional computing systems, such as the requestor system and the data repository. By establishing a network configuration that causes both information requests and responses to the requests to be received by a separate computing system, such as the access control system, the security of any sensitive data (e.g., in response to the information requests) is improved. For example, using a network architecture that includes three computing systems (e.g., the requestor system, the access control system, and the data repository) may separate the requestor system from the data repository, and limit access to secured data stored on the repository. Certain implementations described herein provide for protecting sensitive information by controlling access to secured data that represents the sensitive information.

In some implementations, the access control system may determine attributes based on the secured data. For example, an attribute may be generated by the access control systems based on a lens that is applied to the secured data. The attribute may indicate an equivalency between the requested data and the secured data, such as an equivalency between geographical regions, financial metrics, employment or education information, or other types of variables. In some cases, the access control system may generate a score associated with the attributes, such as a score based on multiple weighted attributes and a relative trust of each attribute.

The following examples are provided to introduce certain implementations of the present disclosure. For example, a requestor system requests secured information, such as to generate a classification recommendation for a user based on analysis of the secured information. The request may be received by an access module, which may determine one or more types of secured information associated with the request. The access module may provide an access request to a third-party system, such as a data repository, that securely stores one (or more) of the types of secured information. In response to the access request, the third-party system may enable the access module to access the stored secured information during a period of time. In addition, the access module may implement a timer for the period of time. Upon completion of the period of time, the access module may have limited or no access to the secured information stored by the third-party system. As the requestor system does not retain the data, or maintain any access to the data, security is improved by reducing a number of computing systems that have access to the data.

In addition, the access module may allow the requestor system to access adjusted data that is based on the secured data. For example, the access module may select portions of the secured data according to a lens indicating one or more filter criteria, and allow the requestor system to access the filtered data. In addition, the access module may generate adjusted data based on the secured data and the lens, such as adjusted data that omits sensitive or private information, and allow the requestor system to access the adjusted data. The access module may also generate one or more attributes based on either the secured data or the adjusted data, and provide the attributes or a related score to the requestor system. In some cases, the access module may allow the requestor system to access the adjusted data (e.g., filtered data, modified data) or scored attributes during the period of time. In addition, the access module may prevent the requestor system from accessing the secured data stored with the third-party system.

Referring now to the drawings, FIG. 1 depicts an example of a computing environment 100 in which access to secured data may be controlled. In the computing environment 100, an access module 110 may control access to data that is stored in one or more of data repositories 130a, 130b, or 130c. For example, one or more of the data repositories 130a, 130b, or 130c may store secured data, such as data representing sensitive, private, or otherwise protected types of information. The access module 110 may control the access of a requestor system 160 to the stored data, including the secured data. Security of the sensitive information may be improved, for example, by limiting access of the requestor system 160 to the secured data, such as by controlling access via the access module 110.

The access module 110 may include one or more access interfaces. In some cases, each access interface may be associated with a particular computing system with which the access module communicates. For example, the access interface 150 may be associated with the requestor system 160, such that communications between the access module 110 and the requestor system 160 are enabled via the access interface 150. In addition, the access interfaces 140a, 140b, and 140c may be respectively associated with the data repositories 130a, 130b, or 130c, such that respective communications between the access module 110 and the data repositories 130a, 130b, or 130c are enabled via the access interfaces 140a, 140b, and 140c. Each particular access interface may include security features to ensure that computing systems other than the computing system associated with the particular access interface cannot establish communications via the particular access interface. Techniques to provide an access interface include an application programming interface ("API"), queries or structured calls to databases, or any other suitable technique.

In addition, the access module 110 may include one or more lenses, such as lenses 120. Each lens may include information, such as filter criteria or modification instructions, describing a modification that may be applied to data. In some cases, the lenses 120 include computer-executed code or other instructions, and perform operations to modify the data based on the code or instructions. In additional or alternative implementations, the lenses 120 indicate code or instructions that are stored elsewhere (e.g., in a memory device, in a storage device), such that the access module 120 performs the operations to modify the data based on the indications from the lenses 120. Based on the lenses 120, one or more of the access module 110 or the lenses 120 may generate adjusted data. In some cases, the adjusted data is generated based on secured data provided by one or more of the data repositories 130a, 130b, or 130c.

In an implementation, the access module 110 receives a request for information, such as the information request 161 from the requestor system 160. The requestor system 160 may request the information, for example, for the purpose of generating a classification recommendation as a response to an expert query, such as an expert query about (without limitation) a medical or employment decision. In addition, the requestor system 160 may request information that is related to a user of the requestor system 160, such as a customer that has requested the classification recommendation. In some cases, the information requested by the requestor system 160 may be secured data, such as data that describes personally identifiable information ("PIP"), medical information, employment information, or any other type of sensitive data.

Based on the received request, the access module 110 may determine a source for the requested information, such as one or more of the data repositories 130a, 130b, or 130c. For example, the access module 110 may determine that the requested information is stored by the data repository 130a. The access module 110 may generate an access request 111 that indicates one or more of the requested information, an identification of the access module 110, an identification of the requestor system 160, or any other suitable access information.

The access module 110 may provide the access request 111 to the data repository 130a. In addition, the access module 110 may provide the access interface 140a to the data repository 130a. Providing the access interface 140a may include one or more of enabling the interface 140a; exchanging security information with the data repository 130a; disabling any of the other access interfaces 150, 140b, or 140c; or any other suitable operation.

In some cases, responsive to receiving the access request 111, the data repository 130a may determine secured data that includes, or otherwise represents, the requested information. In addition, the data repository 130a may establish a connection with the access module 110 via the access interface 140a. In some cases, the connection between the data repository 130a and the access module 110 may be enabled by one or more networks or additional computing systems. In addition, one or both of the data repository 130a or the access module 110 may terminate the connection, for example, if correct security information is not exchanged or if the requested information is not available in the data repository 130a. In some cases, if the connection is terminated, the access module 110 may temporarily or permanently disable the access interface 140a.

In an implementation, the access module 110 may receive from the data repository 130a the secured data that includes the requested information. In some cases, receiving the secured data may include one or more of creating a copy of the secured data in a local memory or storage device of the access module 110, or accessing, via the access interface 140a, the secured data stored in a memory or storage device of the data repository 130a.

In addition, the access module 110 may receive from the data repository 130a data identifying a time period. The time period may indicate a time span during which the access module 110 may access the secured data. For example, the time period may indicate a duration of access time (e.g., a duration of five minutes). In addition, the time period may indicate one or more timestamps indicating a starting or ending point of the access time (e.g., until 09:00:00, between 15:00:00 and 15:03:00). Additionally or alternatively, the time period may indicate a quantity of events by which the access module 110 may access the secured data. For example, the time period may indicate a particular number of access events (e.g., access to the secured data is allowed on up to three occasions). In some cases, the time period indicates a combination of a duration and a quantity of events (e.g., access is allowed on up to six occasions, and no more than once per month). Responsive to receiving the time period, the access module 110 may activate a timer 115. The timer 115 may determine or otherwise track an amount of time remaining in the time period. Based on the time period, the access module 110 may perform one or more operations related to controlling access of the requestor system 160 to the secured data. Upon completion of the time period (e.g., at the end of a duration, after a quantity of events), the access module may perform one or more operations related to terminating access of the requestor system 160 to the secured data.

In some implementations, the access module 110 may access the secured data based on the time period. For example, the access module 110 may modify the secured data based on one or more of the lenses 120. The access module 110 may select a portion of the data based on filter criteria or modification instructions included in the lens. In addition, the access module may generate adjusted data that is based on the secured data and the modification(s) indicated by the lens. The adjusted data may include, or otherwise represent, the information requested by the requestor system 160. In some cases, the adjusted data may include one or more attributes generated by the access module 110, or a score related to the attributes. Additionally or alternatively, the adjusted data includes data having a granularity, such as a high-granularity representation that includes a relatively large quantity of data, such as several thousand records from a database, or a low-granularity representation that includes a relatively small quantity of data, such as a dozen records from a database. In some cases, the low-granularity representation includes a single number or text item that summarizes the secured data.

In some cases, the access module 110 selects a particular lens based on an indication from one or more of the requestor system 160, the data repository 130a, or another one of the lenses 120. For example, the requestor system 160 may indicate a lens related to time decay (e.g., including data from the past two years, omitting data older than five years, weighting recent data more heavily than older data). In addition, the data repository 130a may indicate another lens related to user preferences (e.g., omitting a user's name from the data). In addition, a particular one of the lenses may indicate another lens (e.g., the lens related to user preferences may indicate a lens related to anonymizing data, such as to anonymize the user's name). In some cases, the access module 110 selects a lens that modifies a granularity of the adjusted data, such as modifying high-granularity data into low-granularity adjusted data (or low-granularity data into high-granularity adjusted data). Additionally or alternatively, the selected lens modifies a granularity of a portion of the adjusted data, or modifies multiple granularities of respective portions of the adjusted data. For example, the adjusted data may be multi-granularity data that includes a first data portion having high granularity and a second data portion having low granularity.

The requestor system 160 may access the adjusted data via the access interface 150 during the time period. In some cases, the requestor system 160 may perform analysis of the adjusted data, such as to generate a recommendation in response to an expert query. Security and privacy may be increased for any sensitive information represented by the secured data, such as by allowing the requestor system to access the adjusted data instead of the secured data. In addition, the data may be used to its fullest extent.

Upon completion of the time period, the access module 110 may terminate, or otherwise reduce, access of the requestor system 160 to the adjusted data. For example, the access module 110 may modify a granularity of the adjusted data, such as modifying a high-granularity representation of the adjusted data into a low-granularity representation. Furthermore, the access module 110 may prevent the requestor system 160 from accessing the adjusted data by disabling the access interface 150. In addition, the access module 110 may remove the adjusted data, such as by deleting the adjusted data from the local memory or storage device of the access module 110. In addition, the access module 110 may remove any locally stored copies of the secured data, if such local copies had been created. In some cases, the access module 110 may disable the access interface 140a. In some cases, the computing environment 100 may provide an architecture in which the access module is remotely located from the requestor system 160, or from the data repositories 130a, 130b, and 130c, or from both. The architecture of the computing environment 100 may more easily limit access of the requestor system 160 to the adjusted data, such as by disabling the access interface 150.

In some implementations, the access module 110 may access data from multiple sources in response to a particular request for information. For example, the requestor system 160 may request information describing online transactions of multiple users. The access module may provide the access interfaces 140a, 140b, and 140c to the respective data repositories 130a, 130b, and 130c. Each of the data repositories 130a, 130b, and 130c may provide access to its respective secured data, and may also provide a respective time period during which the access module 110 may access the respective secured data. One or more of the respective time periods may indicate a different amount of time (or different timestamps). The access module 110 may select one or more portions of the secured data, generate adjusted data based on the selected portion and one or more of the lenses 120, and enable access to the adjusted data via the access interface 150. For example, the access module 110 may select a portion of the secured data based on a user preference lens, remove some of the selected portion based on a time decay lens, and anonymize the remainder of the portion based on an anonymization lens. In addition, the access module may generate adjusted data based on the selected, time-adjusted, and anonymized data portion. The requestor system 160 may access the adjusted data based on the respective time periods (e.g., a duration of time, a quantity of access events). If one of the time periods expires (e.g., a time period received from data repository 130c), the access module 110 may revise the adjusted data to omit data related to the expired time period (e.g., based on secured data from the data repository 130c), and provide access to the revised adjusted data. In some cases, one or more of the data repositories 130a, 130b, or 130c may be hosted by third-party organizations (e.g., organizations that do not also operate either the access module 110 or the requestor system 160).

In addition, the data may be classified, such as in an ontology of data. In some cases, the classification is based on one or more of the lenses 120. For example, a lens may classify data into categories, such as based on a source of data (e.g., credit card purchasing data, bank savings history, borrowing data, educational history, employment history). In addition, a lens may aggregate data based on an abstraction of the data, such as a type (e.g., PII, financial, demographic, professional), a range of time, or any other suitable abstraction. In some cases, classification of data may be based on domain knowledge, such as classification into types based on previous expertise. In addition, classification of data may be based on machine learning algorithms or other automated techniques of classification. In some cases, an intended use of data may be used as the basis of a data classification.

Data in the data repositories 130a, 130b, and 130c may be received or stored via one or more techniques. In some cases, the data may be receiving by one or more computing systems operated by an entity (e.g., a company, a non-profit organization, a governmental agency) during normal operations of the entity. Data may be gathered, for example, during operations such as applying for a mortgage, maintaining a bank account, investing money, or other operations related to lending or borrowing financial resources. In some cases, such data related to lending and/or borrowing may be accessible by the access module based on a sharing requirement, such as a governmental regulation or contractual agreement. In addition, a user (e.g., a consumer participating in the mortgage application, investment, etc.) may be unable to prevent sharing of the lending/borrowing data. In some implementations, access to lending/borrowing data may be determined based in part on a lens indicating a sharing requirement. Additionally or alternatively, access to lending/borrowing data may be determined based in part on a lens indicating a data granularity that is allowed (or disallowed) by the sharing requirement.

In addition, data may be received by one or more computing systems operated by an entity that has a business relationship with a user (e.g., a customer of a company, a student of a university). Data may be gathered, for example, based on transactions, communications, received products (e.g., purchased items, grades or degrees received), or other interactions between the entity and the user during the business relationship. In some cases, such data related to business transactions may be accessible by the access module based on a permission granted by the user. For example, the user may be able to allow or prevent sharing of the transaction data (e.g., by granting or withdrawing a permission). In some implementations, the user could decide to allow sharing of the transaction data to improve accuracy of a recommendation generated by the requestor system 160. For instance, the user could allow sharing of transaction data related to bank account daily transactions, educational history, and employment history, to improve accuracy of a recommendation related to a car loan application (e.g., to obtain more favorable loan terms). In some implementations, access to transaction data may be determined based in part on a lens indicating a permission granted (or withheld) by the user. Additionally or alternatively, access to transaction data may be determined based in part on a lens indicating a data granularity that is allowed (or disallowed) by the user.

In addition, the data in the data repositories 130a, 130b, and 130c may be provided to one or more of the computer systems by the user, such as via a user interface implemented in an application, web browser, or voice-activated personal assistant. For example, the user may provide data to a computer system associated with the access module 110, to create a profile. One or more lenses may be generated, for example, based on a profile determined by the user. The user may provide data related to personal interests, such as preferred business relationships, hobbies, medical conditions, news topics, or any other area personal interest. In some cases, data related to personal interests may be accessible by the access module based on a permission granted by the user. In some implementations, the user could decide to allow sharing of the personal interest data to improve accuracy of a recommendation generated by the requestor system 160. For instance, the user could allow sharing of personal interest data related to an exercise goal and dietary restrictions, to improve accuracy of a recommendation related to offers received by the user. In some implementations, access to personal interest data may be determined based in part on a lens indicating a permission granted (or withheld) by the user. Additionally or alternatively, access to personal interest data may be determined based in part on a lens indicating a data granularity that is allowed (or disallowed) by the user.

In some cases, a profile created based on user data and permissions may be associated with the user, such as by a universal identification ("ID"). The profile may be initiated or updated based on lending/borrowing data, transaction data, personal interest data, or any combination of these. The universal ID of the profile may be based on one or more identifying items, such as a password, biometric data, knowledge-based queries, a token, or any other identifying item or combination of identifying items. For example, the universal ID may be created by a software module based on an encrypted combination of multiple biometrics (e.g., iris scan, voiceprint, face recognition, fingerprint, infrared vein image).

In some implementations, the data in the data repositories 130a, 130b, and 130c may be received using one or more transmission techniques, such as batch transfers, periodic transfers, a push/pull transfer (e.g., in response to a notification), or by any other suitable transmission technique. The data may be stored in any suitable format, including on one or more databases, in a shared database, in a virtual or distributed computing system (e.g., cloud systems), in a distributed ledger (e.g., blockchain ledgers), or in any other suitable format.

Figure 2:
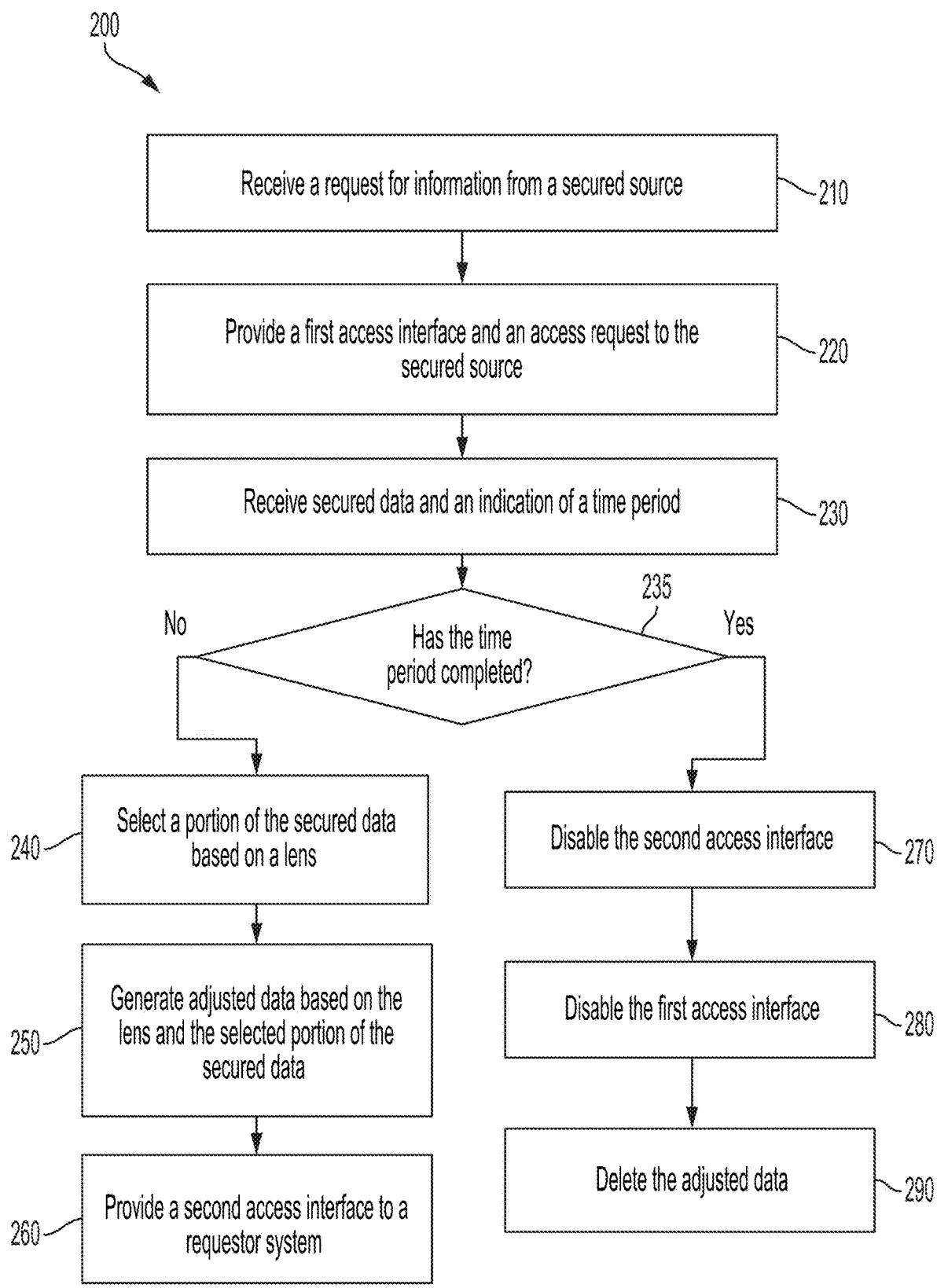
FIG. 2 is a flow chart diagram depicting an example of a process for controlling access to secured data, according to certain implementations.

FIG. 2 is a flow chart depicting an example of a process 200 for controlling access to secured data that represents sensitive information. In some implementations, such as described in regards to FIG. 1, a computing device executing an access module implements operations described in FIG. 2, by executing suitable program code. For illustrative purposes, the process 200 is described with reference to the examples depicted in FIG. 1. Other implementations, however, are possible.

At block 210, the process 200 involves receiving a request for information that is stored in a secured source. The requested information may be included, for example, in secured data that is stored on the secured source. For example, the access module 110 may receive an information request 161 that indicates information stored on one or more of the data repositories 130a, 130b, or 130c. In addition, the access module 110 may determine that the requested information is included in secured data stored on the secured source.

At block 220, the process 200 involves providing, to the secured source, one or both of a first access interface and an access request. In some cases, the access request indicates the requested information. For example, the access module 110 may provide to the data repository 130a the access interface 140a, such as by enabling the access interface 140a. Also, the access module 110 may provide to the data repository 130a the access request 111. The access request 111 may include (or otherwise describe) the information request 161, security information associated with the access module 110 or the access interface 140a, or any other suitable information.

At block 230, the process 200 involves receiving one or both of secured data and an indication of a time period. The secured data may be received from (or otherwise accessible via) the secured source. The indicated time period may be received from the secured source, or determined based on other information received from the secured source (e.g., an authentication certificate with a timestamp). For example, the access module 110 may receive (or access) the secured data stored on data repository 130a via the access interface 140a. In addition, the access module 110 may receive an indication of a time period from (or based on information from) the data repository 130a.

At block 235, the process 200 involves determining whether the time period is completed. For example, the timer 115 may measure a period of time indicated by the data repository 130a. Additionally or alternatively, the timer 115 may measure a quantity of access events indicated by the data repository 130a. If operations related to block 235 determine that the time period is ongoing (e.g., a time duration is not complete, a quantity of access events is greater than zero), process 200 may proceed to another block, such as block 240. If operations related to block 235 determine that the time period is complete, process 200 may proceed to another block, such as block 270.

At block 240, the process 200 involves selecting a portion of the secured data. In addition, the portion of the secured data may be based on a lens. In addition, multiple lenses may be used (e.g., simultaneously or individually) to select the portion of the secured data. A lens may be selected based on information received with the request for information, or from the secure source, or based on information included in another lens. For example, the access module may select some or all of the secured data from the data repository 130a, based on one or more of the lenses 120. The access module 110 may determine which of the lenses 120 to use based on one or more indications received from the requestor system 160, the data repository 130a, or another one of the lenses 120.

At block 250, the process 200 involves generating adjusted data. The adjusted data may be based on one or both of the lens and the selected portion of the secured data. In addition, the adjusted data may comprise one or more of the requested information, a modification of the selected portion of the secured data, a high-granularity or low-granularity representation of the selected portion of the secured data, attributes based on the selected portion of the secured data, or a score related to the adjusted data (e.g., a score of the attributes). For example, the access module 110 may generate adjusted data that includes a modification of the secured data from the data repository 130a, such that the modification is based on one or more of the lenses 120. In addition, the adjusted data may include the requested information indicated by the information request 161.

At block 260, the process 200 involves providing a second access interface to an additional computing system, such as a requestor system. In some cases, the second access interface is provided to a requestor system that provided the request for information. Adjusted data, such as the adjusted data generated based on the lens and the secured data, may be accessible via the second access interface. For example, the access module 110 may provide the access interface 150 to the requestor system 160, to access adjusted data generated by the access module 110.

Following block 260, the process 200 may proceed to another block, such as one or more of blocks 235, 240, or 210. In some implementations, if operations related to block 235 determine that the time period is complete, the process 200 may proceed to one or more of blocks 270, 280, or 290. For example, responsive to determining that the timer 115 has completed (e.g., the time duration is completed, the quantity of access events is zero), the access module may perform one or more operations related to one or more of blocks 270, 280, or 290.

At block 270, the process 200 involves disabling the second access interface. Disabling the second access interface may include terminating a network connection, revoking a security certificate, or any other suitable technique. For example, the access module 110 may disable the access interface 150 such that the requestor system 160 cannot access the adjusted data via the access interface 150.

At block 280, the process 200 involves disabling the first access interface, such as by using any suitable technique. For example, the access module 110 may disable the access interface 140*a* such that the secured data stored with data repository 130*a* is not accessible by the access module 110.

At block 290, the process 200 involves deleting the generated adjusted data. In some cases, additional data related to the adjusted data is also deleted, such as the request for information, timer information, or any locally stored secured data. For example, the access module 110 may delete the adjusted data and any local copies of the secured data that are stored on a memory device for the access module 110. The access module 110 may also delete the information request 161, or delete (or otherwise modify) the timer 115.

In some cases, operations related to one or more of blocks 235, 240, 250, 260, 270, 280, and 290 are repeated for additional secured sources that store secured data related to the request for information. For example, the access module 110 may determine that each of the data repositories 130*a*, 130*b*, and 130*c* include secured data related to the information request 161. In addition, the access module 110 may generate adjusted data based on secured data from each of the data repositories 130*a*, 130*b*, and 130*c*. The access module 110 may also maintain additional timer information for each of the data repositories 130*a*, 130*b*, and 130*c*, and provide (or disable) one or more of the access interfaces 140*a*, 140*b*, 140*c*, and 150 based on some or all of the additional timer information.

Lenses

In some cases, secured data may be modified based on one or more lenses. For example, a lens may include filter criteria, modification instructions, or any combination of these. Based on the filter criteria or modification instructions, an access module may generate adjusted data from the secured data. For example, and not by way of limitation, the access module may select a portion of the secured data based on a filter criterion, and convert values in the selected data based on a modification instruction. In addition, the access module may modify the secured data based on a combination of lenses, including simultaneous combinations, such as multiple lenses that are applied as part of a particular modification, or sequential combinations, such as multiple lenses that are applied in a series of ordered or unordered modifications.

Figure 3:
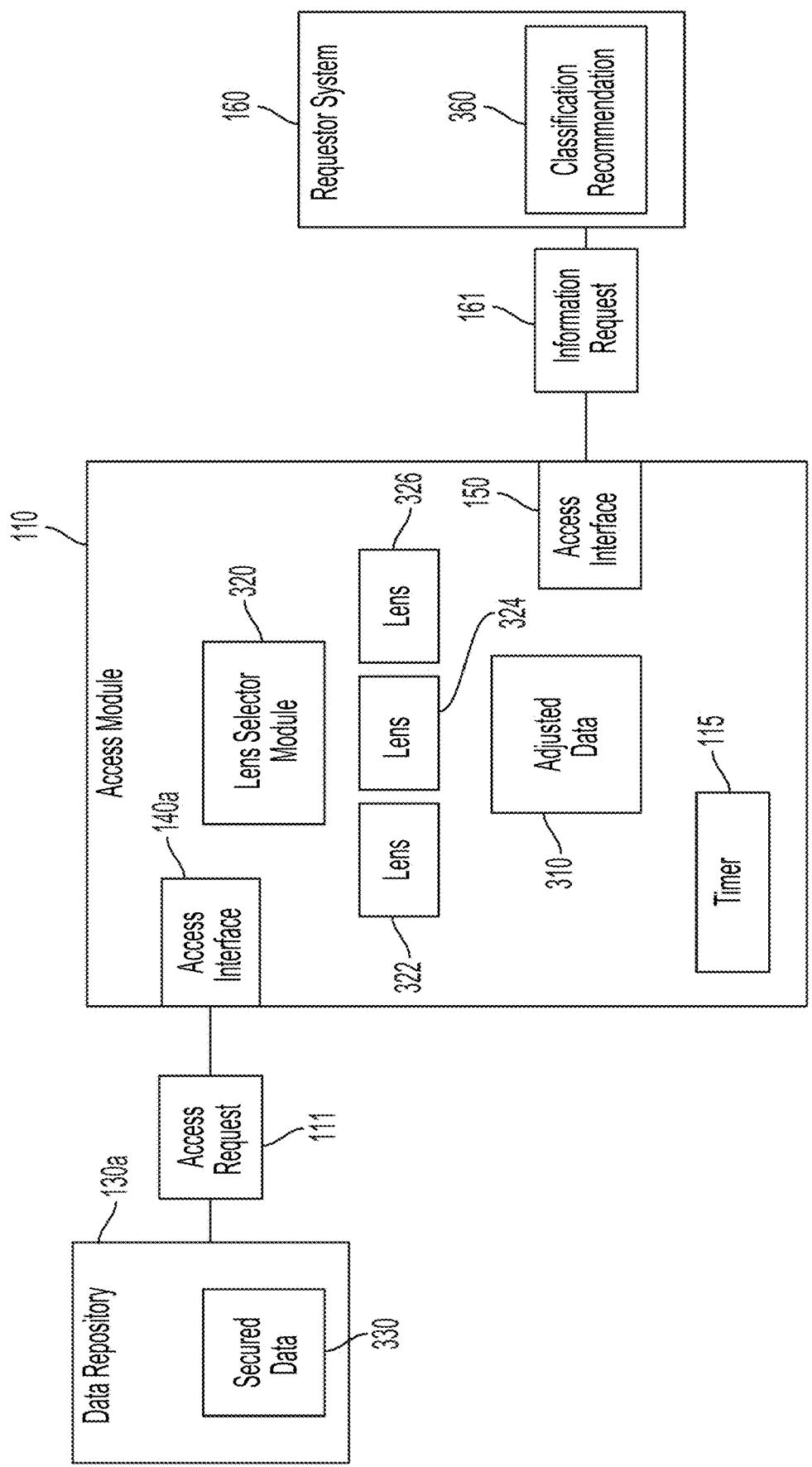
FIG. 3 is a diagram depicting an example of a system that may apply lenses to modify secured data, according to certain implementations.

In FIG. 3, the access module 110 provides the access interfaces 140*a* and 150, respectively, to the data repository 130*a* and the requestor system 160. In addition, the access module 110 may enable or disable the access interfaces 140*a* and 150, for example, based on information received from either the requestor system 160 or the data repository 130*a*.

In some implementations, the access module receives the information request 161 from the requestor system 160. Based on the information request 161, the access module 110 may determine that the requestor system 160 has requested information that is stored on a secure data source. For example, the information request may indicate some or all of secured data 330, which is stored on the data repository 130*a*. In additional or alternative implementations, the access module 110 may determine that the requested information may be determined based on the secured data 330, such as based on an analysis or modification of some or all of the secured data 330.

The access module 110 may provide the access request 111 to the data repository 130*a*. In some cases, the access request 111 may be provided via the access interface 140*a*. The access request 111 may indicate the information requested by the requestor system 160. In addition, the access request 111 may indicate additional information, such as an identification of the access interface 140*a* or security information associated with one or more of the access module 110 or the requestor system 160. The data repository 130*a* may provide access to the secured data 330 based on the access request 111. For example, the access module 110 may receive (or otherwise access) some or all of the secured data 330 via the access interface 140*a*. In addition, the access module 110 receives an indication of a time period from the data repository 130*a*. The timer 115 may be instantiated based on the time period indicated by the data repository 130*a*, or on a time period indicated in a lens (e.g., one of the lenses 120), or a combination of indicated time periods. In FIG. 3, the secured data 330 is depicted as remaining on the data repository 130*a* and the timer 115 is depicted as remaining on the access module 110, but other implementations are possible. For example, a copy of some or all of the secured data 330 may be stored on a local memory device of the access module 110. In addition, the data repository 130*a* may instantiate an additional timer in an additional memory device local to the data repository 130*a*.

The access module 110 may generate adjusted data 310 based on the secured data 330. In addition, the adjusted data 310 may be stored on the local memory device of the access module 110. During the indicated time period, such as while the timer 115 is running, the access module 110 may provide access to the adjusted data 310 via the access interface 150. For example, the requestor system 160 may access the adjusted data 310 and perform an analysis based on the requested information that is included in the adjusted data 310. In addition, the requestor system 160 may generate a classification recommendation 360 based on the adjusted data 310 (or on the analysis thereof). After the completion of the indicated time period, the access module may terminate access to the adjusted data 310, such as by disabling one or more of the access interfaces 150 or 140*a*. In addition, the access module 110 may delete (or otherwise modify) the adjusted data 310 from the local memory device of the access module 110. If a local copy of the secured data 330 is stored on the local memory device of the access module 110, the access module 110 may also delete the local copy upon completion of the indicated time period.

In some embodiments, the access module generates the adjusted data based on one or more lenses. For example, a lens selector module 320 included in the access module 110 may determine that the adjusted data 310 is to be generated based on a modification of the secured data 330. In addition, the lens selector module 320 may select a lens 322, a lens 324, and a lens 326 by which the adjusted data 310 is to be generated. The selected lenses 322, 324, and 326 may be selected based on, for example, information received from one or more of the requestor system 160, the data repository 130*a*, or another one of the selected lenses 322, 324, and 326.

The access module 110 may generate the adjusted data 310 based on a combination of the selected lenses 322, 324, and 326. In addition, the access module 110 may apply any of the selected lenses 322, 324, and 326 simultaneously, or in a sequence. For example, the access module may modify the secured data 330 based on the selected lens 322 to generate a first set of adjusted data. In addition, the access module may modify the first set of adjusted data based on the selected lenses 324 and 326 to generate a second set of adjusted data. Additional modifications may be made based on additional lenses (or combinations of lenses). In some cases, the access module 110 may provide access to the adjusted data 330 after all lenses that are selected by the lens selection module 320 are applied.

Lens Types

A lens may include one or more filter criteria, wherein portions of the secured data are withheld or included based on the filter criteria. Non-limiting examples of filter criteria include (without limitation) matching a data characteristic, selecting data from a range, comparing data to a threshold, or any other suitable filter criterion. In some cases, data that is to be withheld is modified, such as to anonymize (or otherwise render incomprehensible) the data to be withheld. In some cases, lenses may be inclusive, such as a lens indicating that data meeting one or more criteria is included or represented in adjusted data (e.g., a whitelist). Additionally or alternatively, lenses may be exclusive, such as a lens indicating that data meeting one or more criteria is excluded from or unrepresented in adjusted data (e.g., a blacklist).

A lens may include one or more modification instructions, wherein portions of the secured data are modified based on the modification instructions. Non-limiting examples of modification instructions include (without limitation) expert rules, mathematical operations, combination of the data with additional data, or any other suitable modification instruction.

In some cases, a particular lens can include filter criteria or modification instructions that are directed to a particular type of modification. Examples of lens types include (without limitation) user preference, anonymization, data abstraction, time decay, data weighting, data confidence, data equivalence, data granularity, regulatory requirements, categorical, transactional, or any other suitable category of modification by which adjusted data may be generated. Lenses may be used together, such that the adjusted data is generated based on multiple lenses. In some cases, a lens may indicate an additional lens to perform a modification of secured data. For example, based on an instruction in a user preference lens, the access module may determine that the secured data is to be anonymized. In addition, the access module may select an anonymization lens and apply the anonymization lens to the secure data.

A user preference lens may include filter criteria or modification instructions that indicate a preference instruction provided by a user, such as a customer who is using the requestor system. The user may provide the preference instruction via, for example, a user interface (e.g., graphical interface, voice interface, text interface) on a computing device (e.g., a personal computer, a smartphone, a voice-activated virtual assistant). In some cases, the preference instruction is provided via a data curation assistant system. Adjusted data that is generated based on the user preference lens may omit, include, or modify portions of the secured data (or a granular representation of the secured data) as indicated by the preference instruction.

An anonymity lens may include filter criteria or modification instructions that anonymize a portion of the secured data. For example, the anonymity lens may include filter criteria to omit sensitive data, such as PII or financial account information. In addition, the anonymity lens may include modification instructions that modify the secured data such that sensitive data is withheld, such as by obscuring (e.g., blurring, hashing, redacting) the sensitive data. In some cases, the sensitive data is withheld while a context of the sensitive data is provided (e.g., describing a quantity of credit card transactions while obscuring associated account numbers).

A granularity lens may include filter criteria or modification instructions that indicate a granularity (e.g., a level of detail) for some or all of the secured data. In some cases, the granularity lens may include criteria or instructions indicating a level of detail for a portion of the secured data. For example, the granularity lens may include filter criteria to generate a high-granularity representation of a first portion of the secured data, such as a highly detailed representation of a relatively large quantity of data (e.g., several thousand records from a database). In some cases, the high-granularity representation includes secured data that is considered raw data (e.g., generated data that is unchanged subsequent to generation). In addition, the granularity lens may include filter criteria to generate a low-granularity representation of a second portion of the secured data, such as a low-detail representation of a relatively small quantity of data (e.g., a dozen records from a database). In some cases, the low-granularity representation includes a single number or text item that summarizes the secured data. In some cases, a low-granularity representation of the sensitive data is provided while a high-granularity representation is withheld.

An abstraction lens may include filter criteria or modification instructions that indicate a categorical modification to the secured data. In some cases, the abstraction lens may include criteria or instructions by which types of information in the secured data are categorized (e.g., employment data, education data, lifestyle data). In addition, the abstraction lens may include criteria or instructions by which a characteristic of the secured data is modified. For example, based on the abstraction lens, the access module determines dates and a range of time associated with the secured data. Based on the dates and the range of time, the access module may generate extrapolated data or interpolated data. For example, the access module may determine that the secured data describes a series of transactions occurring on different dates over a range of two months. In addition, the access module may interpolate the data to a target time range that is less than the associated range of time, or extrapolate the data to a target time range that is greater than the associated range of time.

A geographical equivalence lens may include filter criteria or modification instructions that indicate similarities between data associated with a first geographical region and adjusted data associated with a second geographical regions. The access module may generate adjusted data based on equivalencies indicated by the geographical equivalence lens. For example, a university in a geographical location (e.g., a country) may have certain characteristics, such as an admissions rate of a certain percentage of applicants, an average starting salary for graduates, or a prestige associated with a particular program of study. In some cases, the geographical equivalence lens may include expert rules capable of determining a similarity between the university and another university in another location (e.g., another country). Based on the expert rules, secured data describing a degree received from the university may be modified to describe the similarity with a degree received from the other university. In addition, the geographical equivalence lens may indicate other types of geographical equivalence, such as equivalences based on cost of living, standard of living, employment information (e.g., a company having characteristics such as average salary or prestige of employment), or any other suitable geographical characteristic.

A regulatory lens may include filter criteria or modification instructions that indicate a data modification based on legal or regulatory requirements (e.g., for a geographical region or other jurisdiction). The access module may generate adjusted data based on information included in the regulatory lens. For example, the access module may generate data that omits a portion of the data that is prohibited for use in generating a classification recommendation, and include another portion of the data that is permitted for use in generating the classification. In addition, the access module may apply an additional modification, such as emphasizing a portion of the data that is associated with a regulatory incentive (e.g., public health initiatives, tax benefits).

A time decay lens may include filter criteria or modification instructions that indicate a data modification based on time. Based on the time decay lens, the access module may generate adjusted data based on a date, a time range, or other types of time-related information included in the secured data. For example, the access module may generate adjusted data that includes financial transactions occurring within the most recent seven years and omits transactions occurring longer ago than seven years. In addition, the access module may generate adjusted data that emphasizes a medical event occurring within the most recent year and deemphasizes another medical event occurring ten years ago.

A weighting lens may include filter criteria or modification instructions that indicate a weight or emphasis placed on a portion of the secured data. Based on the weighting lens, the access module may assign weights to different types of data described by the secured data, such as time-sensitive data. For example, a medical event occurring within the most recent year may be assigned a higher weight than a medical event occurring ten years prior.

A data confidence lens may include filter criteria or modification instructions that indicate whether a portion of the secured data has a given confidence level. For example, self-reported data based on self-reported information from a customer may have a relatively low confidence level (e.g., the customer may choose to misrepresent the information). In addition, validated data based on validated information (e.g., information provided by the customer, but verified by a third party) may have a confidence level higher than the self-reported data. Also, decision data based on decision information (e.g., from a third-party computing system that has previously generated a classification recommendation for the customer) may have a confidence level higher than the validated data. Also, originator data based on original information (e.g., from a third-party computing system that has generated data related to the customer) may have a confidence level higher than the decision data. In some cases, a confidence in provided data may be derived based on a quality assessment of data previously supplied by a same provider. Based on the data confidence lens, the access module may modify different types of data described by the secured data, such as self-reported data.

A categorical lens may include filter criteria or modification instructions that indicate a category, such as a category of secured data or a user associated with the secured data, based on a portion of the secured data. For example, filter criteria in a categorical lens may indicate that the portion of secured data describes a user who is self-employed. In some cases, a categorical lens may indicate data that fits a described category (e.g., a whitelist). Additionally or alternatively, a categorical lens may indicate data that falls outside a described category (e.g., a blacklist). Examples of categories described by a categorical lens include (without limitation) employment (e.g., self-employed, commission-based employment), lifestyle (e.g., renter, homeowner, pet owner, prefers outdoor exercise), education (e.g., highest degree earned, alma mater), familial status, or any other suitable category. Adjusted data that is generated based on the categorical lens may omit, include, or modify portions of the secured data (or a granular representation of the secured data) that fit a described category.

A transactional lens may include filter criteria or modification instructions that indicate relationships between interactions, such as monetary interactions performed by a user associated with the secured data. The access module may generate adjusted data based on the indicated relationships between transactional data. In some cases, the transactional lens may include expert rules capable of determining a similarity between multiple transactions. For example, the similarity may be determined between multiple transactions performed by the user (e.g., across a range of time, across geographical locations), or based on transactions performed by multiple users (e.g., associated with respective portions of secured data), or on a combination of transactions (e.g., by various users, at various times, at various locations). Based on the expert rules, secured data describing one or more transactions performed by a user may be modified to describe a similarity with additional transactions (e.g., by the user, by additional users). In some cases, the secured data describing the one or more transactions may be modified to describe a probability associated with the one or more transactions, such as a probability describing a likelihood of performing an additional transaction of a particular type, a probability describing a risk of non-payment of a monetary transaction, or other suitable probabilities associated with transactions. In some implementations, any combination of the lens types may be used to generate adjusted data. For example, the access module may apply a combination of a data confidence lens and a weighting lens to remove a first portion of the data (e.g., having a low confidence value) and to assign a range of weights to a second portion of the data (e.g., having medium to high confidence values). In an additional example, the access module may apply a combination of a user preference lens and an anonymity lens to determine a user's preferred level of anonymity and to anonymize a portion of the data based on the user's preferred level. In a further example, the access module may apply a combination of an abstraction lens, a regulatory lens, and a time decay lens to determine one or more abstract categories of the data (e.g., medical information, financial information), remove a portion of the data that is prohibited for use in generating a classification recommendation (e.g., remove medical information), and to modify another portion of the data based on a time range (e.g., retain financial information from the most recent seven years, remove financial information older than seven years). Other combinations of lenses, including combinations including multiple lenses from a same type of lens, will be apparent to one skilled in the art of data protection.

Attributes and Scoring

In some implementations, the access module 110 determines one or more attributes based on the secured data 330. An attribute may be generated based on mathematical analysis of the secured data 330. For example, the access module 110 may generate an attribute indicating a financial metric (e.g., a debt-to-income ratio). The access module 110 may include the financial metric attribute in the adjusted data 310, such that the requestor system 160 may access the financial metric attribute via the access interface 150 during the time period. In addition, the access module 110 may prevent the requestor system 160 from accessing the data on which the financial metric attribute is based. In addition, an attribute may be generated based on patterns, such as behavioral patterns, determined in the secured data 330. Furthermore, an attribute may be identified by a user, such as an indication received from a user of a characteristic of the user (e.g., family-oriented, prefers outdoor exercise). An attribute may be associated with a profile of the user, such as a profile created by the user to indicate permissions associated with the user's data.

In some cases, attributes may indicate an equivalency of data. An equivalency may indicate a relationship between multiple portions of data, such as between secured data and requested data. For example, the requestor system 160 may request financial information, such as information related to the cost of living for a person. The requestor system 160 may request the financial information in relation to a first financial currency and a first country (or other geographical region). However, the secured data 330 may include information about the person's cost of living in a second country with a second currency. In some cases, the access module 110 may generate an attribute indicating an equivalence between the secured data 330 and the information requested by the requestor system 160. For example, the attribute may be based on the secured data 330, and one or more lenses related to data equivalence, such as lenses including currency exchange ratios, standards of living for geographical regions, cost of living for geographical regions, or other suitable types of data equivalence. The adjusted data 310 may include an attribute indicating a cost of living in the first country (e.g., the requested information) and omit data describing a cost of living in the second country (e.g., the information available in the secured data 330). Other types of equivalency attributes may be generated by the access module 110, such as equivalency of educational history (e.g., prestige of a degree), employment history (e.g., relative size or worth of companies), lifestyle (e.g., ownership of a car, family size).

In some cases, attributes may be generated based on domain knowledge of established rules (e.g., currency exchange rates). In addition, attributes may be generated (or modified) based on machine learning algorithms. For example, an attribute related to a cost of living may be generated based on domain knowledge describing average income and currency exchange rates. In addition, the attribute may be generated based on machine learning algorithms that determine a prestige associated with a lifestyle choice (e.g., a two-bedroom apartment may be considered minimal in one region, but luxurious in another region).

In some implementations, a score may be determined based on one or more attributes, such as equivalency attributes or financial metric attributes. In addition, the score may be determined based on a trust associated respectively with each attribute. In some cases, the attributes are weighted, such as with a weight respectively indicating a relative importance of each attribute. In some implementations, the score is determined based on the example Equation 1. However, other implementations are possible.

$$S=f(A,T,W) \qquad \text{Eq. 1}$$

In Equation 1, a score S may be determined as a function $f$ of attributes A, trust factors T, and weights W. The vector A may represent a vector of attributes, such as a vector $\{a_1, a_2, a_3, \ldots a_n\}$ which includes the attributes $a_1$ through $a_n$. In addition, the vector T may represent a vector of trust factors, such as a vector $\{t_1, t_2, t_3, \ldots t_n\}$ which includes the trust factors $t_1$ through $t_n$. In addition, the vector W may represent a vector of weights, such as a vector $\{w_1, w_2, w_3, \ldots w_n\}$ which includes the weights $w_1$ through $w_n$. In some cases, each respective one of the trust factors $t_1$ through $t_n$ is associated with a respective one of the attributes $a_1$ through $a_n$. In addition, each respective one of the weights $w_1$ through $w_n$ is associated with a respective one of the attributes $a_1$ through $a_n$. For example, the trust factor $t_1$ and the weight $w_1$ may each be associated with the attribute $a_1$. In some implementations, the function $f$ may be determined based on domain knowledge, such as rules based on prior experience with one or more of the attributes A. In addition, the function $f$ may be determined based on machine learning algorithms, such as algorithms that learn a relationship between a particular attribute, the trust factor and weight associated with the particular attribute, and an observed historical outcome associated with the particular attribute (e.g., a lending outcome).

In some implementations, the access module 110 may generate a score. The score may be included in the adjusted data 310, and the requestor system 160 may access the score, such as via access interface 150. The score may represent information requested by the requestor system 160, or equivalent data to the requested information. For example, if the requestor system 160 requests information in relation to a first currency and a first geographical region, but the secured data 330 includes information related to a second currency and a second geographical region, the access module 110 may generate a score indicating an equivalence between the secured data 330 and the information requested by the requestor system 160. In some cases, a score may be associated with a profile of a user. In addition, a score based on attributes may be compared to one or more additional metrics related to a user. For example, a score based on attributes associated with a user may be compared to a credit score for the same user. A combined score may be generated based on the comparison. In addition, the attribute score (or credit score) may be modified based on the credit score (or attribute score). In some implementations, the access module 110 (or another computing system) generates a reason code indicating why a particular attribute score (or combined score) was generated. The reason code may be included in the adjusted data 310.

Information Requests Via a Data Curation Assistant

In some implementations, a user may interact with his or her personal information, such as secured data or PII, via a requestor system. For example, a customer may use a data curation assistant system that is capable of providing or requesting information related to the customer's personal information. In some cases, one or more of secured data that includes the customer's personal information, or a lens that indicates an instruction provided by the customer (e.g., a user preference lens) may be modified based on information provided or received by the data curation assistant system. As a non-limiting example, the customer may interact with personal credit information via a data curation assistant system, such as by adding or removing information from secured data that includes the personal credit information.

Figure 4:
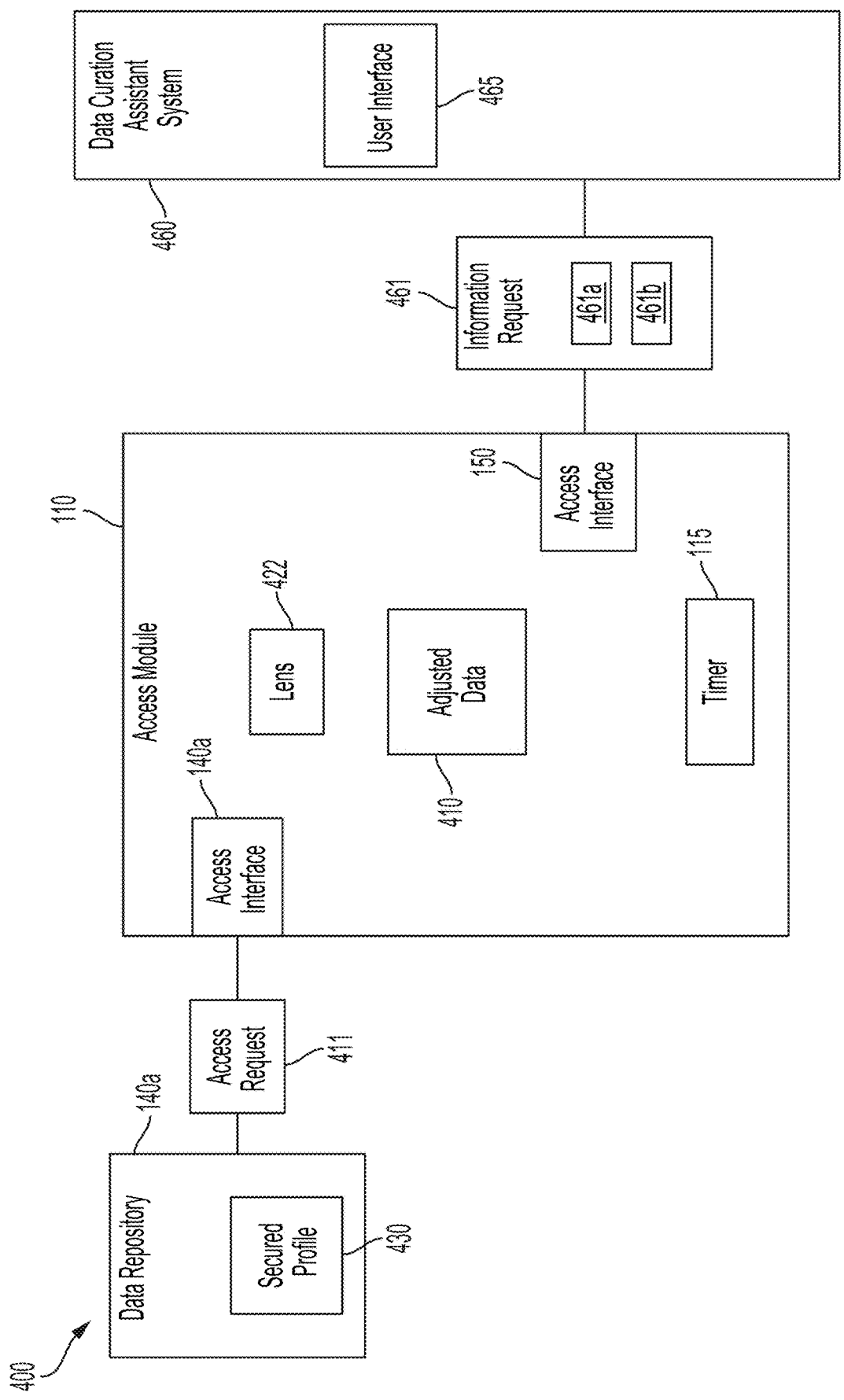
FIG. 4 is a diagram depicting an example of a computer system by which a user may interact with personal data, according to certain implementations.

FIG. 4 depicts an example of a computing system 400 via which a user may interact with personal information. For example, the user may interact with the personal data via a data curation assistant system 460. The data curation assistant system 460 may be included, for example, in an application that is executed on a personal computing device (e.g., a smartphone, a tablet, a personal computer). In addition, the data curation assistant system 460 may be provided by an additional computing system, such as a service provided by a remote server, such that the data curation assistant system 460 is accessible via a web browser or a voice-activated virtual assistant.

In the computing system 400, a data curation assistant system 460 may receive inputs from a user, or provide outputs to the user, such as via a user interface 465 that is included in the data curation assistant system 460. The user interface 465 may receive or provide inputs or outputs via a suitable input or output device, such as a keyboard, mouse, display screen, touchscreen, microphone, speaker camera, accelerometer, biometrics (e.g., fingerprint scanner), or any other suitable device. In addition, the user interface 465 may receive or provide inputs or outputs via an electronic technique, such as a text message, an email, a data object transmitted via one or more networks, or any other suitable technique. In some cases, the user interface 465 may receive or provide inputs or outputs related to identification or security, such as inputs verifying an identity of the user.

The user may request information via the user interface 465, such as a request for information stored in the data repository 140*a*. For example, the user may request information that is included in a secured profile 430 that is stored in the data repository 140*a*. The secured profile 430 may include sensitive information that is stored on behalf of the user, such as (without limitation) PII, financial information, credit history, employment history, educational history, spending patterns, medical information, or any other type of sensitive information associated with the user. In addition, the sensitive information may be provided by the user (e.g., self-reported), or provided by an additional computing system (e.g., reported by medical or financial institutions), or a combination of these sources.

In some cases, the data curation assistant system 460 provides an information request 461 based on one or more inputs received via the user interface 465. The information request 461 may include a request to modify the secured profile 430, such as by adding, removing, or changing data stored in the secure profile 430, or a request to modify one or more lenses that are associated with the secured profile 430, or both. In some cases, the information request 461 is generated by the data curation assistant system 460 based on an analysis of inputs to the user interface 465. For example, based on analysis of the inputs, the data curation assistant system 460 may identify one or more modifications, and generate the information request 461 that includes the identified modifications.

For example, and not by way of limitation, the user may determine that he or she is expecting to purchase a new car. In addition, the user may provide one or more inputs to the data curation assistant system 460 indicating that he or she is interested in receiving information about car models, car reliability, and options for financing a vehicle. The data curation assistant system 460 may analyze the inputs and identify, based on the analysis, a first modification that modifies the secured profile 430, such as by adding financial data (e.g., savings or banking information) to the secured profile 430. In some cases, the first modification indicates that the added financial data is high-granularity data (e.g., highly detailed records describing saving patterns of the user). In addition, the data curation assistant system 460 may identify, based on the analysis, a second modification that modifies a user preference lens 422 that is associated with the secured profile 430, such as by allowing requestor systems associated with car companies or financial lenders to request information included in the secured profile 430 (e.g., to provide an offer that is appropriate to the user's interest in purchasing a car). In some cases, the second modification indicates that the requestor systems are allowed to request low-granularity data (e.g., a low-detail summary of a portion of data from the secured profile 430). In some implementations, the information request 461 generated by the data curation assistant system 460 may include an instruction 461*a* indicating the first modification and an instruction 461*b* indicating the second modification identified by the data curation assistant system 460. In addition, the information request 461 may be generated based on an additional input by the user, such as an input indicating the user's agreement to the modifications identified by the data curation assistant system 460.

In the computing system 400, the access module 110 may receive the information request 461 from the data curation assistant system 460, via the access interface 150. The information request 461 may indicate, based on the included instructions 461*a* and 461*b*, the first and second modifications. In some implementations, the access module may generate an access request 411 based on the instruction 461*a*, and provide the access request 411 to the data repository 140*a*, via the access interface 140*a*. Based on the access request 411, the data repository 140*a* may perform the first modification, such as by adding the financial data to the secured profile 430. In some cases, the financial data (or other information for a requested modification) may be included in the access request 411. In addition, the financial data (or other information) may be received from an additional computing system, such as from a banking institution indicated by the access request 411.

In some implementations, the access module 110 may modify the user preference lens 422 based on the instruction 461*b*. For example, the access module 110 may update a preference instruction indicated by the user preference lens 422. The updated preference instruction may allow requestor systems associated with car companies or financial lenders to request information included in the secured profile 430. Based on the modified lens 422, for example, a requestor system associated with a car company may receive adjusted data (e.g., such as adjusted data 310 described in regards to FIG. 3) that represents a portion of the secured profile 430. In addition, based on the modified lens 422, a requestor system associated with a commercial vehicle company may receive adjusted data that does not represent the secured profile 430.

The access module 110 may generate adjusted data 410 based on information associated with one or more of the first and second modifications. For example, the adjusted data 410 may be generated based on information confirming the performed modifications, such as a confirmation of the first modification (e.g., received from the data repository 140*a*), or of the second modification (e.g., received from the lens 422, or a computing system storing the lens 422). The adjusted data 410 may be provided to the data curation assistant system 460 via the access interface 150. In addition, the data curation assistant system 460 may provide an indication of the completed modifications based on the adjusted data 410, such as a confirmation message displayed via the user interface 465. In some cases, the adjusted data 410 is available to the data curation assistant system 460 during a time period indicated by the timer 115, such as a time period associated with a secured network session on the data curation assistant system 460.

In some implementations, the data curation assistant system 460 may generate additional information requests to further modify the secured profile 430 or associated lenses. For example, and not by way of limitation, the user may decide that he or she will not be purchasing a new car. The user may provide additional inputs to the data curation assistant system 460 indicating the decision. Responsive to the additional inputs, the data curation assistant system 460 may generate an additional information request that includes a modification to the secured profile 430, such as removing the added financial data, and a modification to the user preference lens 422, such as by updating a preference instruction to prevent requestor systems from accessing the secured profile 430. In some cases, the user may control an amount and/or type of data included in the secured profile 430 via the data curation assistant system 460. In addition, the user may control an amount and/or type of requestor systems that may request information included in the secured profile 430. By allowing the user to control the secured profile 430 and/or control requests for included information, the data curation assistant system 460 may increase security of sensitive information included in the secured profile 430. In addition, the user may experience a greater sense of satisfaction or peace of mind by controlling the secured profile 430 via the data curation assistant system 460.

Example Computing Systems

Figure 5:
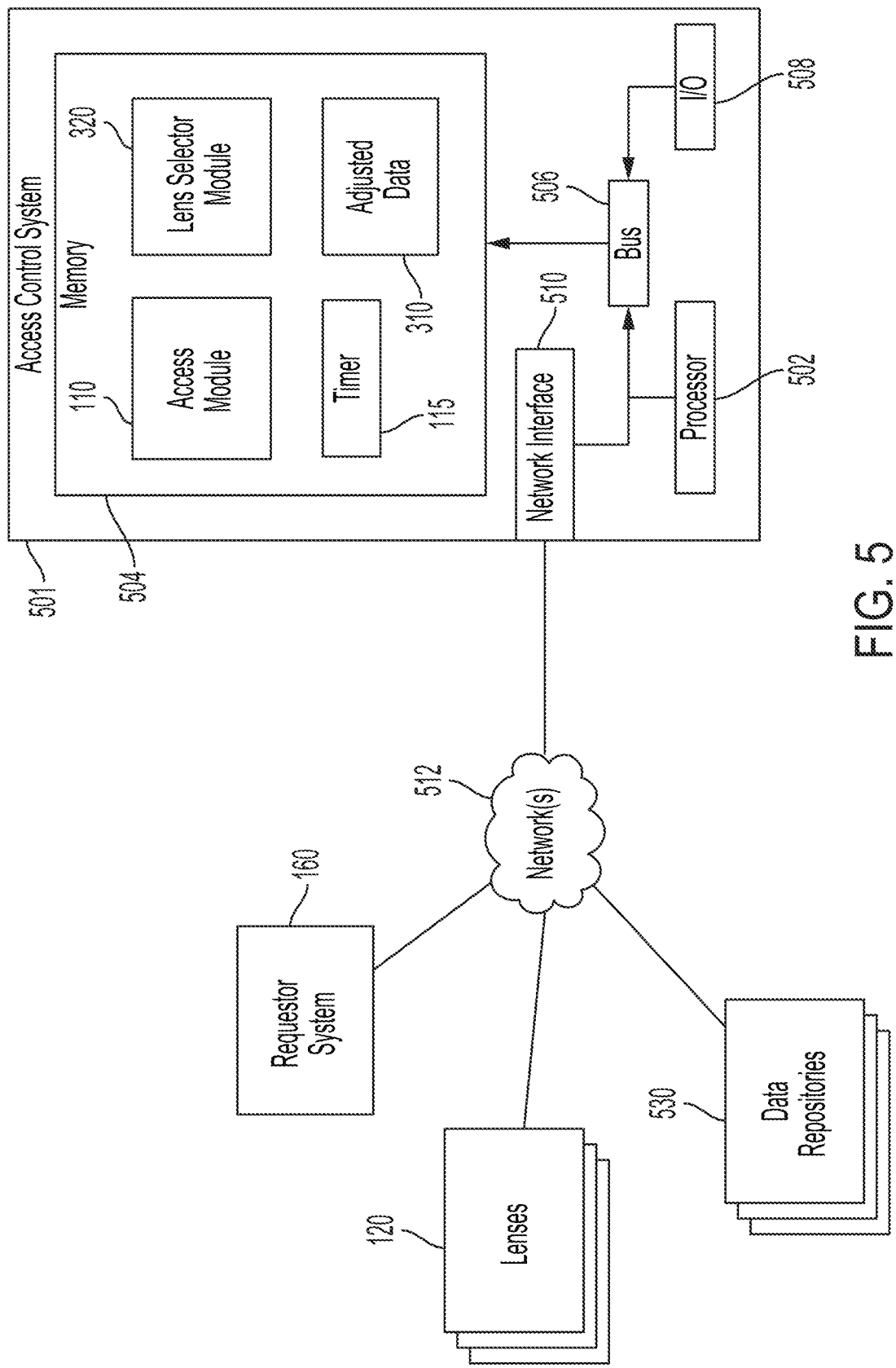
FIG. 5 is a block diagram depicting an example of a computing system for implementing an access control system, according to certain implementations.

Any suitable computing system or group of computing systems can be used for performing the operations described herein. For example, FIG. 5 is a block diagram depicting a computing system capable of controlling access to data, according to certain implementations.

The depicted example of an access control system 501 includes one or more processors 502 communicatively coupled to one or more memory devices 504. The processor 502 executes computer-executable program code or accesses information stored in the memory device 504. Examples of processor 502 include a microprocessor, an application-specific integrated circuit ("ASIC"), a field-programmable gate array ("FPGA"), or other suitable processing device. The processor 502 can include any number of processing devices, including one.

The memory device 504 includes any suitable non-transitory computer-readable medium for storing the access module 110, the timer 115, the lens selector module 320, the adjusted data 310, and other received or determined values or data objects. In some cases, the lenses 120 or one or more of the selected lenses 322, 324, or 326 may be stored on the memory device 504. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Scala, Python, Perl, JavaScript, and ActionScript. The memory device 504 may be accessed by the access control system 501. In some cases, the memory device 504 may be accessed via an enabled access interface, such as the access interfaces 150*a*, 150*b*, 150*c*, or 150.

The access control system 501 may also include a number of external or internal devices such as input or output devices. For example, the access control system 501 is shown with an input/output ("I/O") interface 508 that can receive input from input devices or provide output to output devices. A bus 506 can also be included in the access control system 501. The bus 506 can communicatively couple one or more components of the access control system 501.

The access control system 501 executes program code that configures the processor 502 to perform one or more of the operations described above with respect to FIGS. 1-3. The program code includes operations related to, for example, one or more of the access module 110, the timer 115, the lens selector module 320, the adjusted data 310, or other suitable applications or memory structures that perform one or more operations described herein. The program code may be resident in the memory device 504 or any suitable computer-readable medium and may be executed by the processor 502 or any other suitable processor. In some implementations, the program code described above, the access module 110, the timer 115, the lens selector module 320, and the adjusted data 310 are stored in the memory device 504, as depicted in FIG. 5. In additional or alternative implementations, one or more of the access module 110, the timer 115, the lens selector module 320, the adjusted data 310, and the program code described above are stored in one or more memory devices accessible via a data network, such as a memory device accessible via a cloud service. The memory devices accessible via the data network may be secured memory devices, such that access to the adjusted data 310 is controlled by the access control system 501.

The access control system 501 depicted in FIG. 5 also includes at least one network interface 510. The network interface 510 includes any device or group of devices suitable for establishing a wired or wireless data connection to one or more data networks 512. Non-limiting examples of the network interface 510 include an Ethernet network adapter, a modem, and/or the like. In some implementations, one or more of the access interfaces 150*a*, 150*b*, 150*c*, or 150 are implemented via the network interface 510. Additional computing systems, such as the requestor system 160, data repositories 530 (such as the data repositories 130*a*, 130*b*, and 130*c*), or a computing system including one or more of the lenses 120 can be connected to the access control system 501 via network 512, and the additional computing systems may perform some of the operations described herein, such as providing secured data 330; providing a selected lens 322, 324, or 326; or providing the information request 161. The access control system 501 is able to communicate with one or more of requestor system 160, data repositories 530, or a computing system including one or more of the lenses 120 the remote computing system 515 using the network interface 510 (such as via one or more of the access interfaces 150*a*, 150*b*, 150*c*, or 150). Although FIG. 5 depicts the lenses 120 as accessible to the access control system 501 via the networks 512, other implementations are possible, including the lenses 120 being stored in the memory device 504 of access control system 501.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific implementations thereof, it will be appreciated that those skilled in the art, upon attaining an understanding of the foregoing, may readily produce alterations to, variations of, and equivalents to such implementations. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A system for controlling access to secured data, the system comprising:
    a processing device; and
    a memory device in which instructions executable by the processing device are stored for causing the processing device to perform operations comprising:
        receiving, from a requestor system, a request for information represented by secured data stored in a secured source,
        providing an access request to the secured source indicating the requested information,
        receiving, from the secured source, the secured data and an identification of a time period, and
        controlling access of the requestor system to the secured data during the time period, wherein controlling access to the secured data comprises:
            selecting, based on one or more lenses, a portion of the secured data, each lens including one or more of a filter criterion or a modification instruction,
            generating, on a memory device, adjusted data comprising the requested information and a modification of the selected portion of the secured data, wherein the modification is based on the one or more lenses and comprises multi-granularity data that includes high-granularity data from a first part of the selected portion of the secured data and low-granularity data based on a second part of the selected portion of the secured data,
            providing the adjusted data to the requestor system, and
            subsequent to completion of the time period:
                preventing the requestor system from accessing the adjusted data, and
                deleting the adjusted data from the memory device.

2. The system of claim 1, wherein preventing the requestor system from accessing the adjusted data comprises disabling a first access interface through which the system is capable of communicating with the secured source and disabling a second access interface through which the system is capable of communicating with the requestor system.

3. The system of claim 1, wherein the operations further comprise selecting the one or more lenses based on an indication received from one of: the requestor system, or the secured source.

4. The system of claim 1, wherein the one or more lenses includes one or more filter criteria, and the adjusted data is generated based on a filtered portion of the secured data selected by applying the one or more filter criteria to the secured data.

5. The system of claim 1, wherein the one or more lenses includes multiple filter criteria, wherein the filter criteria are each related to a given one of: anonymization, data equivalence, data abstraction, time decay, financial attributes, user preferences, data confidence, data granularity, categorization, transaction data, or regulatory requirements.

6. The system of claim 1, wherein the operations further comprise:
    during the time period, determining (i) multiple dates associated with the portion of the secured data and (ii) a range of time associated with the multiple dates,
    wherein generating the adjusted data comprises one of:
        generating extrapolated data based on the multiple dates and a first target time range that is greater than the range of time associated with the multiple dates, or
        generating interpolated data based on the multiple dates and a second target time range that is less than the range of time associated with the multiple dates.

7. The system of claim 1, wherein the operations further comprise:
    determining an attribute based on the selected portion of the secured data;
    determining a trust associated with the attribute; and
    generating a score based on the attribute and the associated trust, wherein the adjusted data includes the generated score.

8. A method that includes one or more processing devices of an access control system performing operations comprising:
    providing, to a secured source, an access request indicating requested information by a requestor system;

receiving, from the secured source, secured data including the requested information and an identification of a time period; and controlling access of the requestor system to the secured data during the time period, wherein controlling access to the secured data comprises:

selecting, based on a lens, a portion of the secured data, generating, on a memory device, adjusted data based on the lens and the selected portion of the secured data, wherein the adjusted data comprises the requested information and a modification of the selected portion of the secured data, the modification comprising multi-granularity data including high-granularity data from a first part of the selected portion of the secured data and low-granularity data based on a second part of the selected portion of the secured data, enabling the adjusted data accessible by the requestor system and subsequent to completion of the time period:
preventing the requestor system from accessing the adjusted data, and
deleting the adjusted data from the memory device.

9. The method of claim 8, wherein preventing the requestor system from accessing the adjusted data comprises disabling a first access interface through which the access control system is capable of communicating with the secured source and disabling a second access interface through which the access control system is capable of communicating with the requestor system.

10. The method of claim 8, further comprising selecting the lens from a group of lenses, wherein the lens is selected based on an indication received from one of: the requestor system, or the secured source.

11. The method of claim 8, wherein the lens includes one or more filter criteria, and the adjusted data is generated based on a filtered portion of the secured data selected by applying the one or more filter criteria to the secured data.

12. The method of claim 8, wherein the lens comprises multiple filter criteria, wherein the filter criteria are each related to a given one of: anonymization, data equivalence, data abstraction, time decay, financial attributes, user preferences, data confidence, data granularity, categorization, transaction data, or regulatory requirements.

13. The method of claim 8, further comprising:
during the time period, determining (i) multiple dates associated with the portion of the secured data and (ii) a range of time associated with the multiple dates,
wherein generating the adjusted data comprises one of:
generating extrapolated data based on the multiple dates and a first target time range that is greater than the range of time associated with the multiple dates, or
generating interpolated data based on the multiple dates and a second target time range that is less than the range of time associated with the multiple dates.

14. The method of claim 8, further comprising:
determining an attribute based on the selected portion of the secured data;
determining a trust associated with the attribute; and
generating a score based on the attribute and the associated trust, wherein the adjusted data includes the generated score.

15. The method of claim 14, wherein the attribute indicates an equivalency relationship between the selected portion of the secured data and the requested information.

16. A non-transitory computer-readable storage medium having program code that is executable by a processor device to cause a computing device to perform operations comprising:

providing, to a secured source, an access request indicating requested information by a requestor system;

receiving, from the secured source, secured data including the requested information and an identification of a time period; and controlling access of the requestor system to the secured data during the time period, wherein controlling access to the secured data comprises:

selecting, based on a lens, a portion of the secured data, generating, on a memory device, adjusted data based on the lens and the selected portion of the secured data, wherein the adjusted data comprises the requested information and a modification of the selected portion of the secured data, the modification comprising multi-granularity data including high-granularity data from a first part of the selected portion of the secured data and low-granularity data based on a second part of the selected portion of the secured data, enabling the adjusted data accessible by the requestor system and subsequent to completion of the time period:
preventing the requestor system from accessing the adjusted data, and
deleting the adjusted data from the memory device.

17. The non-transitory computer-readable storage medium of claim 16, wherein the operations further comprise selecting the lens from a group of lenses, wherein the lens is selected based on an indication received from one of: the requestor system, or the secured source.

18. The non-transitory computer-readable storage medium of claim 16, wherein the lens comprises one or more filter criteria and the adjusted data is generated based on a filtered portion of the secured data selected by applying the one or more filter criteria to the secured data.

19. The non-transitory computer-readable storage medium of claim 16, wherein the lens comprises multiple filter criteria, wherein the filter criteria are each related to a given one of: anonymization, data equivalence, data abstraction, time decay, financial attributes, user preferences, data confidence, data granularity, categorization, transaction data, or regulatory requirements.

20. The non-transitory computer-readable storage medium of claim 16, wherein the operations further comprise:

during the time period, determining (i) multiple dates associated with the portion of the secured data and (ii) a range of time associated with the multiple dates,
wherein generating the adjusted data comprises one of:
generating extrapolated data based on the multiple dates and a first target time range that is greater than the range of time associated with the multiple dates, or
generating interpolated data based on the multiple dates and a second target time range that is less than the range of time associated with the multiple dates.

\* \* \* \* \*